United States Patent [19]

Iizuka et al.

[11] Patent Number: 4,966,790
[45] Date of Patent: Oct. 30, 1990

[54] COATING COMPOSITIONS

[75] Inventors: Hiroshi Iizuka; Tadao Iwata; Shuichi Ishiwata, all of Chiba, Japan

[73] Assignee: Mitsui Petrochemical Industries, Ltd., Tokyo, Japan

[21] Appl. No.: 270,814

[22] Filed: Nov. 10, 1988

Related U.S. Application Data

[63] Continuation-in-part of Ser. No. 101,966, Sep. 28, 1987, abandoned.

[30] Foreign Application Priority Data

Sep. 26, 1986 [JP] Japan .................. 61-227479

[51] Int. Cl.$^5$ .................. B05D 3/00; B05D 3/10
[52] U.S. Cl. .................. 427/386; 427/239; 427/379
[58] Field of Search .................. 427/230, 239, 273, 334, 427/379, 386

[56] References Cited

U.S. PATENT DOCUMENTS

| | | | |
|---|---|---|---|
| 3,024,130 | 3/1962 | Kish | 427/386 X |
| 3,464,854 | 9/1969 | Bolger | 427/386 |
| 4,022,946 | 5/1977 | Cummings | 427/386 X |
| 4,526,813 | 7/1985 | Wu | 427/239 X |
| 4,555,412 | 11/1985 | Günter et al. | 427/386 X |

Primary Examiner—Earl Nielson

[57] ABSTRACT

According to the present invention, a coat is formed by applying a coating composition comprising an epoxy resin obtained by a bisphenol represented by the formula:

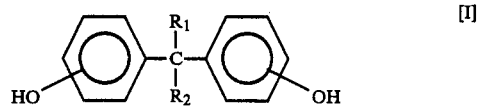

wherein $R_1$ and $R_2$ represent a hydrogen atom or an alkyl group containing from 1 to 3 carbon atoms and a curing agent, to a substrate; and thereafter contactings the resulting coat with a liquid such as warm water or hot water in a one stage or multistage process. The thus formed coat is excellent in properties such as heat resistance, particularly erosion resistance adhesive properties and resistance to leaching of organic constituents contained in the coat exposed to hot water.

8 Claims, No Drawings

COATING COMPOSITIONS

RELATED APPLICATION

This is a continuation-in-part application to our pending application Ser. No. 101,966, filed on Sept. 28, 1987, now abandoned.

FIELD OF THE INVENTION

This invention relates to a process for forming a coat and more particularly to a process for forming an epoxy coat on an inside surface of a hot water piping such as a hot water pipe; a bath tub or the like.

BACKGROUND OF THE INVENTION

Heretofore, bisphenol A type epoxy resins have been used mainly as surface covering coating materials for corrosion protection or surface protection purposes. Generally, these bisphenol A type epoxy resins are used in coating compositions after adjusting viscosity of the resulting coating compositions by addition to said resins of reactive diluents, plasticizers and solvents according to the purpose for which the coating compositions are used and the coating process employed therefor. As curing agents used in such coating compositions referred to above, there are used generally polyamideamine resins, modified polyamine resins, polyamine resins or mixtures thereof.

In the coating compositions conventionally comprising such components as mentioned above, however, there are involved such problems as will be described herein below. Most of the cured products obtained usually have a glass transition temperature of less than 60° C. and, for this reason, such cured products, when used as coating materials for structure members which are exposed to fluids having a temperature higher than 60° C. such as hot water or the like, are found insufficient in heat resistance and adhesive properties, and thus they are hardly fit for use.

Pipes such as hot water pipes and cryogenic heating pipes tend to develop red rust at their inner surface. In some cases, rust can largely grow in the form of a lump. When such a rust develops at the inner surface of the pipes, an ability to pass water through the pipes is greatly lowered. In order to solve such problems, the inner surface of the hot water pipe is provided with a heat-resistant coat.

Plastic unit baths come into contact with high temperature water for a long period of time, and therefore the deterioration and fading of the plastics are generated. In order to solve such problems, the surface of the plastics is provided with a heat-resistant coat.

In order to form the heat-resistant coat on the inner surface of the pipes such as hot water pipes and cryogenic heating pipes, the surface of the unit baths or the like, it is necessary to apply a coating composition to substrates to be coated, followed by curing the composition by heating. Heretofore, heating of the coated substrates such as pipes and unit baths has been effected by infrared irradiation or by hot air blowing. However, such heating processes exhibit inferior thermal efficiency and are economically remarkably disadvantageous.

Further, there has been a problem in that upon curing an epoxy coat, the resulting coat can undesirably foam in some cases.

We have now found that when a specific epoxy composition is used and when a coat is cured by applying this composition to a substrate such as the inner surface of a hot water pipe and thereafter contacting it with a liquid having a specific temperature to cure the coat, the problems described above are solved.

OBJECT OF THE INVENTION

The present invention is intended to solve such problems associated with the prior art as mentioned above, and an object of the invention is to provide a process for forming a coat wherein the coat which is excellent in heat resistance, particularly erosion resistance adhesive properties and resistance to leaching of organic constituents contained in the coat when exposed to hot water and, at the same time, which exhibits no foaming can be efficiently formed on a substrate such as a hot water pipe or a unit bath without using any infrared lamp and without blowing hot air.

SUMMARY OF THE INVENTION

A first process for forming a coat according to the present invention comprises the steps of applying a coating composition comprising an epoxy resin obtained from a bisphenol represented by the formula:

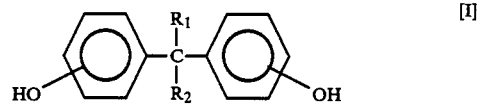

wherein $R_1$ and $R_2$ represent a hydrogen atom or an alkyl group containing from 1 to 3 carbon atoms, and a curing agent, to a substrate; and contacting the coat formed on the substrate with a heated liquid having a temperature of less than 100° C. to cure the coat.

A second process for forming a coat according to the present invention comprises the steps of applying a coating composition comprising an epoxy resin obtained from a bisphenol represented by the formula (I) described above and a curing agent to a substrate, thereafter (a) keeping the coat so formed on the substrate at a temperature in the vicinity of room temperature for no more than 72 hours;

(b) contacting said coat with a heated liquid having a temperature of less than 60° C. to precure the coat; and optionally (c) contacting said coat with a heated liquid having a temperature of at least 60° C. to obtain a coat having a glass transition temperature of from 50° C. to 130° C.

In the present invention, the coat is obtained by applying the coating composition comprising the epoxy resin obtained from the bisphenols represented by the formula (I) described above and the curing agent to the substrate and thereafter contacting the resulting coat with the liquid such as warm water or hot water, and therefore there can be efficiently formed the coat which is excellent in heat resistance, particularly erosion resistance adhesive properties and resistance to leaching of organic constituents contained in the coat when exposed to hot water.

DETAILED DESCRIPTION OF THE INVENTION

Processes for forming coats according to the present invention will be described in detail.

First, an epoxy composition used in forming a coat in the present invention is described.

In the present invention, it is preferable that the epoxy composition be in the form of a coating composition and therefore the epoxy composition in the form of a coating composition is described hereinafter. However, it is not necessarily required that components from which the epoxy composition is prepared be in the form of a coating composition.

In the epoxy compositions according to the invention, there is used as a resin component at least one epoxy resin obtained from a bisphenol of the formula [I] Examples of the bisphenol include, for example, 2,2-bis(hydroxyphenyl)methane 2,2-bis(hydroxyphenyl)ethane or 2,2-bis(hydroxyphenyl)propane represented by the following formulas.

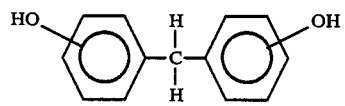

(Bisphenol F)

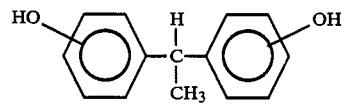

(Bisphenol AD)

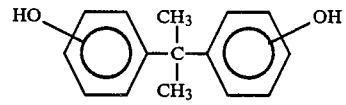

(Bisphenol A)

Such bisphenols can be obtained by condensation of a lower alkyl group-containing carbonyl compound such as formaldehyde, acetaldehyde or acetone with phenol in the presence of acid, and a process for the production of these bisphenols is well known hitherto.

Usually, Bisphenol F is obtained as a mixture comprising about 10–25 mol % of bisphenol having hydroxyl groups at the o- and o'-positions, about 35–60 mol % of bisphenol having hydroxyl groups at the o- and p'-positions and 20–55 mol % of bisphenol having hydroxyl groups at the p- and p'-positions. Bisphenol AD is usually obtained as a mixture in which at least about 80 mol % of bisphenol having hydroxyl groups at the p- and p'-positions is present. Bisphenol A is usually obtained as a mixture in which at least 98 mol % of bisphenol having hydroxyl groups at the p- and p'-positions is present.

By virtue of polycondensation of such bisphenols with epichlorohydrin, the epoxy resins (hereinafter sometimes called Bisphenol F type epoxy resins, Bisphenol AD type epoxy resins or Bisphenol A type epoxy resins) used in the present invention are obtained.

The Bisphenol F type epoxy resins, Bisphenol AD type epoxy resins or Bisphenol A type epoxy resins are formed by reaction represented by the following reaction scheme.

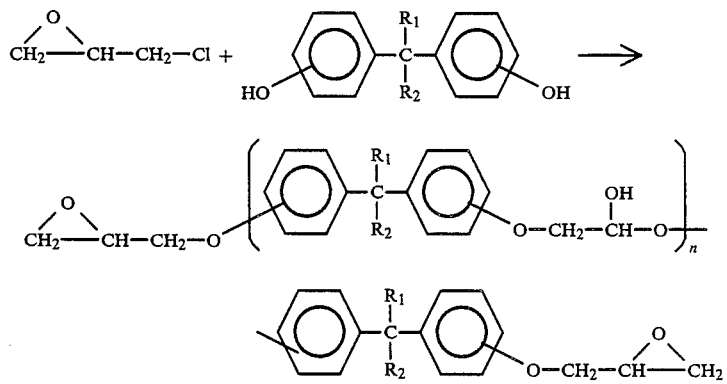

wherein R, and $R_2$ represent a hydrogen atom or an alkyl group containing from 1 to 3 carbon atoms.

These Bisphenol F type epoxy resins or Bisphenol AD type epoxy resins preferably have EEW (an epoxy equivalent weight) ranging from 165 to 185, and Bisphenol A type epoxy resins preferably have EEW ranging from 185 to 195.

In addition to the Bisphenol F type epoxy resins, Bisphenol AD type epoxy resins, and Bisphenol A type epoxy resins, conventionally known epoxy resins can also be used as a part of the epoxy resins component of the present invention alone or in combination. Preferably usable known epoxy resins as a part of the epoxy resin components mentioned above are, for example, novolak type epoxy resins having EEW of from 165 to 185, orthocresolnovolak type epoxy resins having EEW of from 210 to 240, trimethylolpropane triglycidyl ethers having EEW of from 130 to 145 alone or mixtures thereof.

The epoxy resins used in the present invention comprising as essential components Bisphenol F type epoxy resins, Bisphenol AD type epoxy resins or Bisphenol A type epoxy resins preferably have a viscosity of no more than 100 poises at 25° C. The epoxy resins can further be incorporated with small amounts of polyfunctional reactive diluents and, in this case, the diluents are preferably used in such an amount that the resulting cured product will not come to have a glass transition temperature of below 60° C.

The epoxy resins mentioned above are desirably used in the compositions in an amount of from 25 to 80% by weight, preferably from 35 to 70% by weight.

Examples of the curing agents used in the compositions used in the present invention are amine type compounds having a viscosity of no more than 100 poises at 25° C. Concretely, preferably usable as the curing agents are epoxy resin-modified isophorone diamine, epoxy resin-modified 3,3'-dimethyl-4,4'-dicyclohexylaminomethane, epoxy resin-modified m-xylenediamine, etc.

Such curing agents are desirably used in the compositions in an amount of from 8 to 40% by weight, preferably from 15 to 33% by weight. Viewed at another angle, such curing agents are used in such a manner that active hydrogen present in the curing agent falls within the range of from 0.8 to 1.2, preferably from 0.9 to 1.1 equivalents based on one equivalent of the epoxy group of the epoxy resin.

A preferred coating composition which can be used herein comprises (1) from 25 to 80% by weight of an epoxy resin obtained from Bisphenol F and Bisphenol AD and (2) an amine type curing agent having a viscosity of no more than 100 poises, such as those exemplified above, an amount that it may provide from 0.8 to 1.2 equivalents of active hydrogen per one epoxy equivalent of the epoxy resin.

No more than 20% by weight, of plasticizers can be optionally incorporated in the composition used in the present invention.

The coating compositions used in the present invention can be further incorporated with extender pigments or coloring pigments, or both.

Preferably usable as the extender pigments are inorganic powder materials having a true specific gravity of from 0.3 to 4.5 g/cm$^3$, an oil absorption of at least 11 ml and an average particle diameter of no more than 10 $\mu$m. Such inorganic powder materials concretely include calcium carbonate, magnesium carbonate, silica, silica alumina, glass powder, glass beads, asbestos, mica, graphite, barium sulfate, aluminum hydroxide, talc, kaolin, acid clay, activated clay, bentonite, diatomaceous earth, montmorillonite, dolomite, etc. Of those exemplified above, particularly preferred are calcium carbonate, silica, barium sulfate, talc and kaolin.

Preferably usable as the coloring pigments are fine powder materials having a specific gravity of less than 5.7 g/cm$^3$ and an average particle diameter of less than 1$\mu$m. Usable inorganic coloring pigments concretely include titanium oxide, zinc white, carbon black, iron oxide red, cadmium red, titanium yellow, chrome oxide green, cobalt green, ultramarine, Prussian blue, cobalt blue, cerulean blue, cobalt violet, mars violet etc., and usable organic coloring pigments include permanent red, Hansa yellow, benzidine yellow, lake red, phthalocyanine blue, phthalocyanine green, etc. Of the coloring pigments exemplified above, particularly preferred are titanium oxide, ultramarine, cobalt blue, phthalocyanine blue, phthalocyanine green, chrome oxide green, titanium yellow and iron oxide red.

Furthermore, the coating compositions used in the present invention can be incorporated, if necessary, with such additives as defoamers, leveling agents and thixotropic agent, or additional components such as polyfunctional reactive diluents, curing accelerators, etc.

The coating composition used in the present invention can be formed as a two-pot liquid composition, one composed of the epoxy resin and the other composed of the curing agent. For instance, the epoxy resin, extender pigment and/or coloring pigment may be kneaded together to prepare a main composition, while the curing agent, extender pigment and/or coloring pigment may be kneaded together to prepare a curing agent composition. By virtue of mixing the main composition with the curing agent composition, a curable coating composition can be prepared whenever it is to be used.

The thus prepared coating composition is applied onto the surface of a substrate such as the inner surface of a hot water pipe or the wall surface of a unit bath by a conventional method such as spraying or brushing. Application of the composition to the inner surface of the hot water pipe is preferably carried out by spraying the composition over the inner surface by means of fluids (gases). For instance, application of the coating composition to the inner surface of the hot water pipe is preferably carried out while feeding the coating composition to the inner portion of the pipe with air or an nitrogen at a flow rate of at least 20 m/sec.

In the first process for forming the coat according to the present invention, the coat formed on the substrate as described above is brought into contact with a heated liquid, preferably warm water or hot water, having a temperature of less than 100° C., preferably from 40° to 98° C., to cure it. The thus obtained cured coat has a glass transition temperature of from 40° to 140° C., preferably from 60° to 135° C.

In such a first process for forming the coat according to the present invention, the coat formed on the substrate may be brought into contact with the liquid having a temperature of less than 100° C., preferably from 40° to 98° C., e.g., warm water or hot water in a one-stage process. Alternatively, the coat formed on the substrate may be brought into contact with the liquid in a multistage process.

In the first process for forming the coat according to the present invention, the coat formed on the substrate may be cured by keeping it at a temperature in the vicinity of room temperature for no more than 72 hours, preferably from 1 to 72 hours and thereafter contacting the coat with a heated liquid having a temperature of less than 100° C. as described above.

A second process for forming a coat according to the present invention will be described. In the second process for forming the coat, the coating composition is applied to a substrate as described above to form a coat, and thereafter this coat is cured by the following steps (a)–(b) or (a)–(c).

(a) A step of keeping this coat at a temperature in the vicinity of room temperature for no more than 72 hours, preferably from 1 to 72 hours.

We have found that foaming of the coat in the subsequent curing step can be effectively reduced by keeping the coat formed on the substrate at a temperature in the vicinity of room temperature for no more than 72 hours, preferably from 1 to 72 hours.

By the temperature in the vicinity of room temperature is meant from about 15° to 35° C., preferably from about 15° to 35° C.

In order to keep the coat at a temperature in the vicinity of room temperature, the coat may be allowed to stand in an atmosphere having a temperature in the vicinity of room temperature, preferably in air. Optionally, the coat may be substantially statically brought into contact with a liquid having a temperature in the vicinity of room temperature, preferably water.

(b) A step of contacting the coat which has been kept at the temperature in the vicinity of room temperature for no more than 72 hours, preferably from 1 to 72 hours as described above with a heated liquid having a temperature of less than 60° C., preferably a temperature of less than room temperature plus 25° C. to precure the coat.

A pipe having the thus precured coat is then practically used as a hot water pipe or the like to cure the coat.

In the present invention, the following step (c) can be also carried out subsequent to step (b).

(c) An optional step of contacting the coat precured in step (b) described above with a heated liquid having a temperature of at least 60° C., preferably from 60° to 98° C. to cure the coat so that the glass transition temperature of the resulting coat becomes from 50° to 130° C., preferably from 60° to 130° C.

Optionally, in carrying out step (b) or (c), for example, step (c) per se may be carried out in a two-stage or multistage process. That is, for example, the two-stage process may be carried out by contacting the coat with a heated liquid at 65° C. and then contacting it with a heated liquid at 75° C.

In steps (b) and (c) described above, purified water, tap water, circulating water for air conditioning, a saturated calcium chloride aqueous solution, process water or the like is used as the heated liquid.

As described above, in the present invention, the coat formed on the substrate is brought into contact with the liquid having the specific temperature in the one-stage or multistage process to cure it, and therefore it is unnecessary to use an infrared lamp, a hot air generator or the like in order to cure the coat. Thus, the present process is very efficient. Further, in the present invention, the composition containing the specific epoxy resin and the curing agent is used, and therefore there is obtained a coat which is excellent in heat resistance, which is not peeled off from the substrate even if the coat comes into contact with the liquid such as warm water or hot water, in which large amounts of the organic constituents are not leached from the coat when the coat is exposed to hot water, and which is free from a foaming problem.

EFFECT OF THE INVENTION

In the present invention, the coat is obtained by forming the coat on the substrate using the compositions, particularly coating compositions comprising the epoxy resin obtained from the bisphenol represented by the above formula (I) and the curing agent, and then contacting this coat with the heated liquid, and therefore there can be efficiently formed the coat which is excellent in heat resistance, particularly erosion resistance, adhesive properties, resistance to leaching of organic constituents contained in the coat when the coat is exposed to hot water and, at the same time, which exhibits no foaming.

The present invention is illustrated below with reference to examples, but it should be construed that the invention is in no way limited thereto.

Preparation of a coating composition (1)

A main ingredient composition and a curing agent composition having their respective compositions as indicated below were prepared and mixed together to obtain a coating composition (1).

Main ingredient composition:

A mixture of 100 parts of Bisphenol AD type epoxy resin (Trade name Epomick ® R-710 available from Mitsui Petrochemical Industries, Ltd., viscosity 30 poises/25° C., epoxy equivalent weight 165-185), 18 parts of talc, 13 parts of titanium oxide and 1.5 parts of an additive was kneaded with a triple roll mill to obtain a main ingredient composition.

Curing agent composition:

A mixture of 100 parts of isophorone diamine containing epoxy resin-modified polyamine (viscosity 47 poises/25° C., active hydrogen equivalent 83), 20 parts of talc and 10 parts of titanium oxide as extender pigments, 0.7 part of ultramarine as a coloring pigment and 1.9 parts of an additive was kneaded with a triple roll mill to obtain a curing agent composition.

In preparing the coating composition (1), the thus obtained main ingredient and curing agent compositions were mixed together in the proportion of 100 parts to 50 parts (weight ratio).

Preparation of a coating composition (2)

A main ingredient composition and a curing agent composition having their respective compositions as indicated below were prepared and mixed together to obtain a coating composition (2).

Main ingredient composition:

Same as the coating composition (1).

Curing agent composition:

A mixture of 100 parts of 3,3'-dimethyl-4,4'-dicyclohexyl amino methane containing epoxy resin-modified polyamine (viscosity 42 poises/25° C., active hydrogen equivalent 71), 54.4 parts of barium sulfate as an extender pigment, 0.7 part of ultramarine as a coloring pigment and 1.9 parts of an additive was kneaded with a triple roll mill to prepare a curing agent composition.

In preparing the coating composition, the thus obtained main ingredient and curing agent compositions were mixed together in the proportion of 100 parts to 50 parts (weight ratio).

Preparation of a coating composition (3)

The coating composition (3) was prepared as in the coating composition (1) with the exception that Bisphenol F type epoxy resin (Bisphenol F glycidyl ether, viscosity 30 poises/25° C., epoxy equivalent weight 171-175) was used in place of the Bisphenol AD type epoxy resin used in the main ingredient composition (1).

Preparation of a coating composition (4)

The coating composition (4) was prepared as in the coating composition (1) with the exception that a main ingredient composition and a curing agent composition having their respective compositions as indicated below were used.

Main ingredient composition:

A mixture of 100 parts of Bisphenol A type epoxy resin (Epomick ® 140 available from Mitsui Petrochemical Industries, Ltd., epoxy equivalent weight 185-195 viscosity 130 poises/25° C.), 11 parts of butylglycidyl ether (epoxy equivalent weight 138), 20 parts of talc and 14.8 parts of titanium oxide as extender pigments, and 2.2 parts of an additive was kneaded to prepare a main ingredient composition.

Curing agent composition:

A mixture of 100 parts of 4,4'-diaminodiphenyl methane-containing epoxy resin modified aromatic polyamine (active hydrogen equivalent 100-120), 15 parts of talc as an extender pigment, 0.5 parts of ultramarine as a coloring pigment, and 5 parts of an additive was kneaded with a triple roll mill to obtain a curing agent composition.

EXAMPLE 1

The coating composition (1) was applied, by a brush to a steel plate (75 mm×150 mm×9 mm) wherein its surfaces had been degreased with solvent and thereafter subjected to a steel grit treatment.

This coat was allowed to stand for 24 hours at room temperature, and immersed in warm water at 40° C. for one hour to cure it. The glass transition temperature Tg of the resulting coat was measured. The results are shown in Table 1.

EXAMPLE 2

A steel plate coated with a coating composition as in Example 1 was allowed to stand for 24 hours at room temperature, thereafter immersed in warm water at 40° C. for one hour and then in warm water at 60° C. for 30 minutes to cure the coating composition. The Tg of the resulting cured coat was measured. The results are shown in Table 1.

EXAMPLE 3

A steel plate coated with a coating composition as in Example 1 was allowed to stand for 24 hours at room temperature, thereafter immersed in warm water at 40° C. for 60 minutes, in warm water at 60° C. for 30 minutes and then in warm water at 90° C. for 60 minutes to cure the coating composition. The Tg of the resulting cured coat was measured. The results are shown in Table 1.

EXAMPLE 4

A steel plate coated with a coating composition as in Example 1 was immersed in warm water at 40° C. for 4 hours, in warm water at 60° C. for one hour and then in warm water at 90° C. for one hour to cure the coating composition. The Tg of the resulting cured coat was measured. The results are shown in Table 1.

EXAMPLE 5

The coating compositions (2), (3) and (4) were used and their coats were cured as in Example 3. The Tg.s of the resulting coats were measured. The results are shown in Table 1.

The glass transition temperatures of the coats were measured as follows: The coats were cured under the conditions described in Examples, and thereafter these coats were peeled off from the steel plates. Moisture contained in the released coats was then removed under reduced pressure (5 mm Hg), and the glass transition temperatures (Tg.s) of the dried coats were measured by means of DSC (a differential scanning calorimeter manufactured by Seiko Denshi Kogyo).

TABLE 1

| Example No. | Glass Transition Temperature (°C.) |
|---|---|
| 1 | 52 |
| 2 | 68 |
| 3 | 90 |
| 4 | 83 |
| 5 | 106 (Coating Composition (2)) |
|   | 86 (Coating Composition (3)) |
|   | 83 (Coating Composition (4)) |

EXAMPLE 6

The coating composition (1) was applied, by a brush, to a glass plate wherein its surfaces had been degreased with a solvent.

The resulting coat was allowed to stand for 48 hours at room temperature, thereafter immersed in warm water at 50° C. for 2 hours and then immerrsed in warm water at 90° C. for one hour to cure the coat. The glass transition temperature Tg of the resulting coat was measured. The results are shown in Table 2.

EXAMPLE 7

A glass plate coated with a coating composition as in Example 6 was allowed to stand for 48 hours at room temperature, thereafter immersed in warm water at 50° C. for one hour and then in warm water at 70° C. for one hour to cure the coat. The Tg of the resulting cured coat was measured. The results are shown in Table 2.

EXAMPLE 8

A glass plate coated with a coating composition as in Example 6 was allowed to stand for 48 hours at room temperature, thereafter immersed in warm water at 50° C. for one hour and then in warm water at 90° C. for one hour to cure the coat. The Tg of the resulting cured coat was measured. The results are shown in Table 2.

EXAMPLE 9

A glass plate coated with a coating composition as in Example 6 was immersed in warm water at 50° C. for one hour, and then in warm water at 90° C. for one hour to cure the coat. The Tg of the resulting cured coat was measured. The results are shown in Table 2.

EXAMPLE 10

The coating composition (2) was used, and a coat was cured as in Example 8. The Tg of the resulting coat was measured. The results are shown in Table 2.

EXAMPLE 11

The coating composition (3) was used, and a coat was cured as in Example 8. The Tg of the resulting coat was measured. The results are shown in Table 2.

EXAMPLE 12

The coating composition (4) was used, and a coat was cured as in Example 8. The Tg of the resulting coat was measured. The results are shown in Table 2.

TABLE 2

| Example No. | Glass transition Temperature (°C.) |
|---|---|
| 6 | 92 |
| 7 | 86 |
| 8 | 91 |
| 9 | 76 |
| 10 | 106 |
| 11 | 90 |
| 12 | 82 |

What is claimed is:

1. A process for forming a coat which comprises the steps of applying a coating composition comprising an epoxy resin obtained from a bisphenol represented by the formula (I):

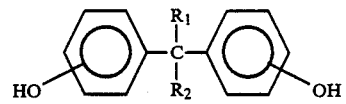

wherein $R_1$ and $R_2$ represent a hydrogen atom or an alkyl group containing from 1 to 3 carbon atoms, and a curing agent, to a substrate; and contacting the coat formed on the substrate with a heated liquid having a temperature of less than 100° C. to cure the coat.

2. The process according to claim 1 wherein the temperature of the liquid which is brought into contact with the coat is from 40° to 98° C.

3. The process according to claim 1 wherein the formed coat has a glass transition temperature of from 50° to 120° C.

4. The process according to claim 1 wherein the coat is brought into contact with the heated liquid in a multi-stage process.

5. A process for forming a coat which comprises the steps of:
(a) keeping a coat formed on a substrate using a composition comprising an epoxy resin obtained from a bisphenol represented by the formula (I):

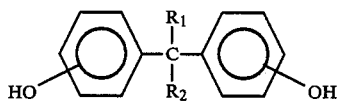  [I]

wherein $R_1$ and $R_2$ represent a hydrogen atom or an alkyl group containing from 1 to 3 carbon atoms, and a curing agent, at a temperature in the vicinity of room temperature for no more than 72 hours; and thereafter
(b) contacting said coat with a heated liquid having a temperature of less than 60° C. to precure the coat.

6. The process according to claim 5 wherein the temperature of the heated liquid used in step (b) is less than from room temperature plus 25° C.

7. A process for forming a coat which comprises the steps of:
(a) keeping a coat formed on a substrate using a composition comprising an epoxy resin obtained from a bisphenol represented by the formula (I):

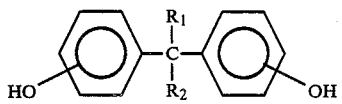  [I]

wherein $R_1$ and $R_2$ represent a hydrogen atom or an alkyl group containing from 1 to 3 carbon atoms, and a curing agent, at a temperature in the vicinity of room temperature for no more than 72 hours; thereafter
(b) contacting said coat with a heated liquid having a temperature of less than 60° C. to cure the coat; and then
(c) contacting said coat with a heated liquid having a temperature of at least 60° C. to obtain a coat having a glass transition temperature of from 50° C. to 130° C.

8. The process according to claim 7 wherein the glass transition temperature of the resulting coat is from 60° to 130° C.

* * * * *